United States Patent
Bour et al.

(10) Patent No.: US 9,090,810 B2
(45) Date of Patent: Jul. 28, 2015

(54) HIGH TEMPERATURE TEMPORARY DIVERTER AND LOST CIRCULATION MATERIAL

(75) Inventors: Daniel L. Bour, Granite Falls, WA (US); Larry Watters, Spring, TX (US); Susan Petty, Shoreline, WA (US); Allen Apblett, Stillwater, OK (US)

(73) Assignee: AltaRock Energy, Inc., Seattle, WA (US)

( * ) Notice: Subject to any disclaimer, the term of this patent is extended or adjusted under 35 U.S.C. 154(b) by 119 days.

(21) Appl. No.: 13/326,285

(22) Filed: Dec. 14, 2011

(65) Prior Publication Data

US 2012/0181034 A1    Jul. 19, 2012

Related U.S. Application Data

(60) Provisional application No. 61/422,738, filed on Dec. 14, 2010, provisional application No. 61/438,767, filed on Feb. 2, 2011, provisional application No. 61/441,838, filed on Feb. 11, 2011, provisional application No. 61/485,530, filed on May 12, 2011, provisional application No. 61/515,816, filed on Aug. 5, 2011.

(51) Int. Cl.

| | |
|---|---|
| *E21B 33/13* | (2006.01) |
| *E21B 43/26* | (2006.01) |
| *C09K 8/504* | (2006.01) |
| *C09K 8/508* | (2006.01) |
| *C09K 8/516* | (2006.01) |
| *C09K 8/62* | (2006.01) |

(52) U.S. Cl.
CPC .............. *C09K 8/5045* (2013.01); *C09K 8/508* (2013.01); *C09K 8/516* (2013.01); *C09K 8/62* (2013.01); *C09K 2208/18* (2013.01); *E21B 43/261* (2013.01)

(58) Field of Classification Search
CPC ............ C09K 8/68; C09K 8/887; C09K 8/62; C09K 8/506; C09K 8/685; C09K 8/035; C09K 8/88; C09K 8/512; C09K 8/516; E21B 43/26; E21B 43/267; E21B 43/261
See application file for complete search history.

(56) References Cited

U.S. PATENT DOCUMENTS

| | | | |
|---|---|---|---|
| 2,788,072 | A | 4/1957 | Goodwin |
| 3,390,723 | A | 7/1968 | Hower et al. |
| 4,715,967 | A | 12/1987 | Bellis et al. |

(Continued)

OTHER PUBLICATIONS

PCT Application PCT/US2011/065004; filed Dec. 14, 2011; Alta Rock Energy, Inc.; International Search Report mailed Apr. 16, 2012.

(Continued)

*Primary Examiner* — Zakiya W Bates
(74) *Attorney, Agent, or Firm* — Thorpe North & Western, LLP

(57) ABSTRACT

A method can include introducing a particulate diverting agent into a first fracture within an underground reservoir formation. The particulate diverting agent can at least partially hydraulically isolate the first fracture. The particulate diverting agent can also be a temporary material which substantially degrades over an extended time. The underground reservoir formation can be stimulated with a stimulation fluid sufficient to expand a second fracture within the underground reservoir formation. The particulate diverting agent can then be allowed to substantially degrade.

19 Claims, 12 Drawing Sheets

(56) References Cited

U.S. PATENT DOCUMENTS

| | | |
|---|---|---|
| 6,380,138 B1 | 4/2002 | Ischy et al. |
| 7,036,587 B2 | 5/2006 | Munoz, Jr. et al. |
| 7,220,709 B1 | 5/2007 | Qu et al. |
| 7,273,099 B2 | 9/2007 | East, Jr. et al. |
| 7,353,876 B2 | 4/2008 | Savery et al. |
| 7,506,689 B2 | 3/2009 | Surjaatmadja et al. |
| 7,565,929 B2 | 7/2009 | Bustos et al. |
| 7,674,753 B2 | 3/2010 | Munoz, Jr. et al. |
| 2006/0185848 A1* | 8/2006 | Surjaatmadja et al. .... 166/280.2 |
| 2008/0070810 A1* | 3/2008 | Mang ............................ 507/219 |
| 2008/0210423 A1 | 9/2008 | Boney |
| 2010/0000736 A1 | 1/2010 | Bour et al. |
| 2012/0181034 A1 | 7/2012 | Bour et al. |

OTHER PUBLICATIONS

EP Application 11849298.2; filed Dec. 14, 2011; Altarock Energy, Inc.; Extended European SearchReport dated Jun. 25, 2014.

* cited by examiner

HIGH TEMPERATURE TEMPORARY DIVERTER AND LOST CIRCULATION MATERIAL

RELATED APPLICATIONS

This application claims the benefit of and priority to U.S. Provisional Patent Application No. 61/422,738, filed Dec. 14, 2010, U.S. Provisional Patent Application No. 61/438,767, filed Feb. 2, 2011, U.S. Provisional Patent Application No. 61/441,838, filed Feb. 11, 2011, U.S. Provisional Patent Application No. 61/485,530, filed May 12, 2011, and U.S. Provisional Patent Application No. 61/515,816, filed Aug. 5, 2011, which are each incorporated herein by reference.

BACKGROUND

Wells are drilled in subterranean formations for a wide variety of applications. Geothermal wells can be used to extract heat from geothermal formations for production of electricity. Oil and gas wells can be used to extract valuable fuels and hydrocarbons from formations. During drilling of wells for geothermal, oil and gas, and other energy applications, the sealing of fractures and other places where fluid can exit a well can be of great value. For example, during the stimulation of a geothermal well, the use of a temporary sealant to seal off one stimulated set of fractures can allow for the stimulation of other sets of fractures. This is especially beneficial for an EGS (Enhanced Geothermal System) or conventional hydrothermal well used for geothermal power production. The more fractures created, the potential production increases on a per well basis.

Sealing of lost circulation zones is also an issue while drilling geothermal wells. Loss of drilling fluid into a formation can cause permanent damage to potentially productive zones. There are a number of existing solutions to the problem of multiple zone stimulation and lost circulation. For example, viscous gels or other organic and inorganic materials are used to block flow in permeable zones. However, such materials typically cause permanent damage to the permeability of the fractures and increase near wellbore pressure drops because they are typically insoluble or leave insoluble residues. Conventional lost circulation materials include materials like walnut hulls, cotton seeds, and other organic and inorganic materials. These materials can help seal a lost circulation zone. However, they typically will not degrade and/or dissolve into non-damaging materials and so the sealing of the fractures and/or lost circulation zoned with these materials is usually permanent. Mechanical hydraulic isolation can be accomplished using a number of mechanisms to hydraulically isolate multiple zones for stimulation. Many of these, like open hole packers, are not well suited for high temperatures that are typically encountered in geothermal land, some oil and gas wells. Another disadvantage is that they typically require that a drilling rig or at least a coiled tubing unit be present over the hole during their use, which means that there will be significant added cost and operational risk to the operation. Also, if the wells are already completed with either a slotted liner or a well screen with gravel pack, a packer cannot be used to isolate the zone.

Oil and gas well (O&G) hydraulic fracturing is usually significantly different from EGS stimulation. There are two major differences. The first is that O&G hydraulic fracturing typically involves applying enough pressure and stress on the formation rock to cause tensile failure and the creation of new fractures. In EGS hydroshearing stimulation, pump pressure is maintained at the shear failure pressure and is carefully controlled and limited to prevent tensile failure. EGS hydroshearing stimulation results in the 'opening' of existing fractures and prevents the creation of new fractures. Once the fracture is opened, the rock faces can then slip past each other. When the fractures close slightly after stimulation pressure is relieved, the irregularities and disparities between the shifted rock faces do not allow the fractures to close completely, leaving a path for water flow with increased permeability.

Another major difference between O&G and EGS stimulation is that sand and chemicals are purposefully pumped into the open fractures in O&G hydraulic fracturing operations to hold the fractures open and create a high permeability flow path from the formation back to the wellbore. Table I lists a representative formulation used in O&G stimulation treatments.

TABLE I

| 2000 bbl Stimulation Treatment | |
|---|---|
| Material | Amount |
| Sand | 300,000 lbs |
| Guar or other gelling agent | 2520 lbs |
| Borate | 84 gal |
| pH Buffer (NaOH or acetic acid) | 84 gal |
| Surfactant | 84 gal |
| Sodium persulfate (breaker) | 84 lbs |

In contrast, for EGS stimulation, sand or other proppants are not injected into the formation nor are chemicals typically added to the water that is being used to stimulate the formations.

In the drilling of wells for geothermal, oil and gas, and other energy applications, intervals of formation are often encountered which experience the problem of lost circulation. Lost circulation is the loss of hole drilling fluid into fractures and other openings in the rock formation. These lost circulation fractures, whether induced or naturally occurring, can be potentially productive, especially in geothermal wells. When hole drilling fluid flows into a fracture in a formation it carries with it solid materials such as bentonite, drill solids, barite, lost circulation material, etc. that can be difficult or impossible to remove completely after the well has been drilled and completed. These materials remain in the fractures and can impede production of geothermal fluids, oil and gas, etc. reduce the productivity of the well and the ultimate economic value of the asset.

To solve this problem conventional lost circulation materials and systems are used in the drilling fluid or as a separate treatment to seal off the losses, but this results in permanent damage to flow of geofluids or oil and gas, often, even if they seal off the losses.

Lost circulation can also result in additional problems. The fluid is lost downhole and can become an expensive and dangerous problem. Lost circulation can lead to hole instability, stuck drill pipe, and loss of well control. At the least, it halts drilling operations and requires expensive replacement volume to be used.

SUMMARY

A method can include introducing a particulate diverting agent into a first fracture within an underground reservoir formation. The particulate diverting agent can at least partially hydraulically isolate the first fracture. The particulate diverting agent can also be a temporary material which substantially degrades over an extended time. The underground reservoir formation can be stimulated with a stimulation fluid sufficient to expand a second fracture within the underground reservoir formation. The particulate diverting agent can then be allowed to substantially degrade.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
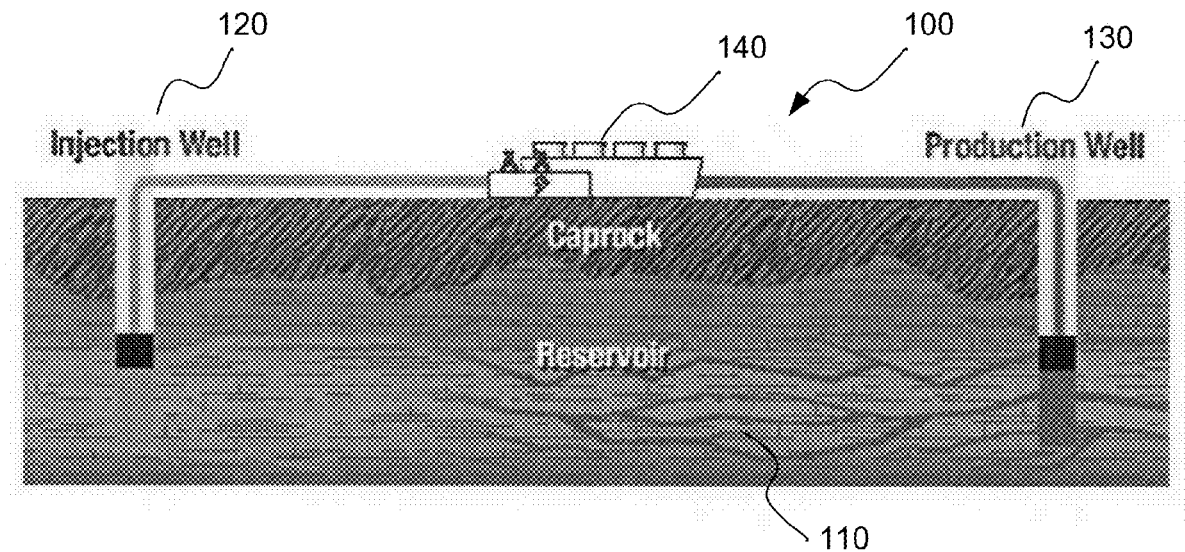
FIG. 1 is a side cross-sectional view of a conventional engineered geothermal system.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the disclosed embodiments may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

In describing and claiming the present invention, the following terminology will be used.

The singular forms "a," "an," and "the" include plural referents unless the context clearly dictates otherwise. Thus, for example, reference to "a particle" includes reference to one or more of such materials and reference to "injecting" refers to one or more such steps.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Engineered/Enhanced Geothermal System (EGS) involve drilling a well into high temperature geothermal reservoir rock. The reservoir rock is then stimulated by performing a hydraulic shear dilation treatment to create a permeable fracture network in the rock. FIG. 1 illustrates an idealized and simplified side view of an EGS 100 for extraction of heat from an underground reservoir 110. During operation, a heat transfer fluid can be forced into an injection well 120 and into adjacent rock formation via fractures. The fluid traverses the underground reservoir 110 along fractures towards a production well 130. During this time, the heat transfer fluid is heated by native heat within the surrounding formation. Although only two wells are illustrated, in practice, multiple injection and/or production wells can be used. Heated fluid is then removed from the underground reservoir 110 via production well 130. The heated fluid is then transferred to a power plant 140 where the heat is extracted for production of electricity or other useful work. Cooled production fluid is then re-injected back into the injection well(s) 120 to form a complete loop which can be repeated as desired. Performance of the EGS system 100 can be a function of fluid flow rates of heat transfer fluid from the injection well(s) 120 to productions well(s) 130.

Fluid flow rates can be decrease by various conditions such as lost flow (to surrounding formation) and/or poor fracture volume or limited number of fractures. Systems described herein can be used to seal off lost circulation zones while drilling of wells that are potentially productive and still produce from them after the well has been drilled. Most lost circulation materials and/or systems cause permanent damage if used to seal lost zones while drilling. Unfortunately, in geothermal operations, those same zones that cause lost circulation problems are also often potential productive zones. Permanent loss of production from these zones can have a significant impact on the economic productivity of the well and/or even damage production to the point that the well is no longer productive.

Figure 2:
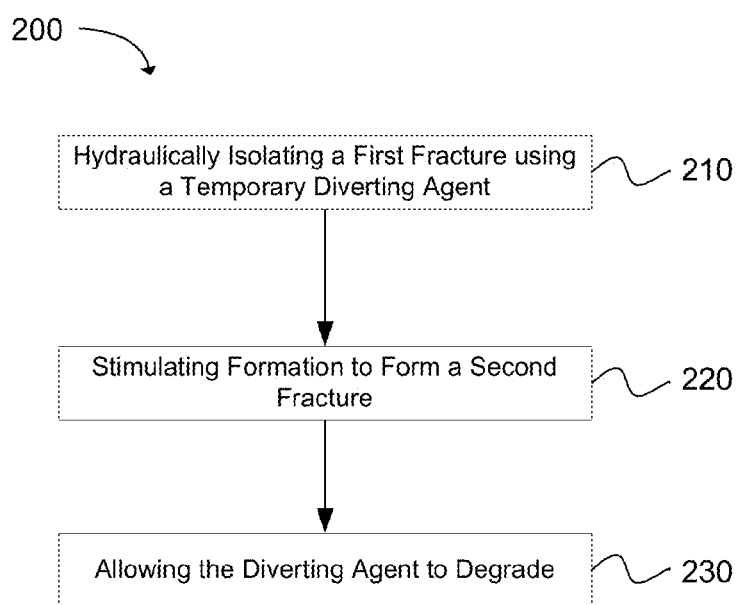
FIG. 2 is a flow chart of an exemplary process of hydraulic stimulation in accordance with one embodiment.

FIG. 2 is a flow chart of an exemplary process 200 of hydraulic stimulation in underground reservoir formations to achieve increases in fluid flow across the underground reservoir, according to one embodiment. A first fracture can be at least partially hydraulically isolated using a temporary diverting agent 210. The particulate diverting agent can be introduced into the first fracture within the underground reservoir formation so as to at least partially seal off the first fracture. This is accomplished by the particles bridging off within and/or at the fracture face in the wellbore. As the particles pack off they form a semi or completely impermeable barrier for further fluid injection into the fracture. As passages are blocked with the diverting agent, fluid flow is reduced sufficient to hydraulically isolate the first fracture from an associated well. Pressure then increases within the wellbore as pumping of stimulation fluid (typically water) continues. When the pressure increases sufficiently a second fracture 220 is then stimulated while the first fracture is hydraulically isolated. A suitable stimulation fluid can be used to stimulate the formation sufficient to produce or expand the second fracture within the underground reservoir formation. Subsequent to completion of stimulation, the particulate diverting agent can be allowed to substantially degrade 230 over time. The degradation process is typically accelerated as the wellbore, cooled down during the injection of low temperature stimulation fluid, begins to heat back up once injection stops.

Figure 3:
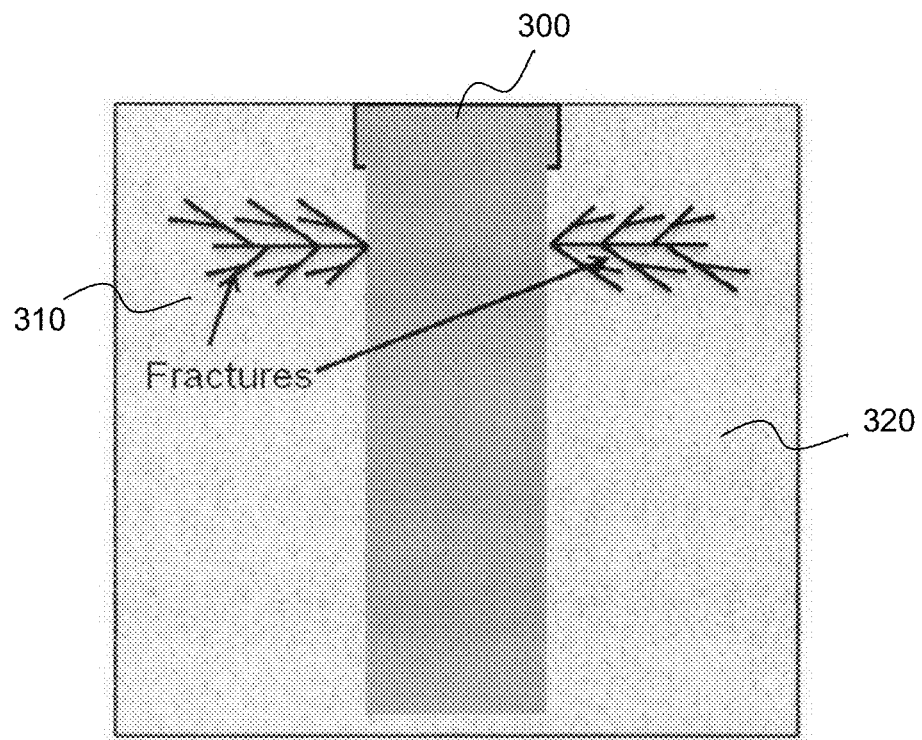
FIG. 3 is a schematic view of a well having a first fracture adjacent the wellbore.

Turning now to FIG. 3, an injection well 300 is formed having a single fracture network 310. Typically, a stimulation fluid such as water is pumped into the well 300 for several days. This pumping creates a fracture network 310 having a desired length and size. Most often, a single fracture network is formed. This is due to the fact that during stimulation the adjacent fracture with the lowest initiation pressure will open when water is pumped from the surface and pressure is applied in the injection well 300. This also means that vast amounts of hot reservoir rock 320 intersected by the injection well 300 remains untapped for heat extraction and power production.

In order to increase the power production on a per well basis more water may be pumped through the given set of fractures, but this approach has physical limitations based on the permeability of the fractures and the fracture gradient of the formation rock. More pressure must be applied to circulate more fluid through the formation. If too much pressure is applied the formation rock can be fractured, increasing the reservoir size, increasing induced seismicity, increasing leakoff to the reservoir (lowering system efficiency), and increasing operational costs, etc. Thus, the approaches described herein provide an effective way of increasing water flow and ultimately power production on a per well basis by creating additional producing fractures in a given injection well. This allows for higher injection and production rates with comparable injection pressures.

Figure 4:
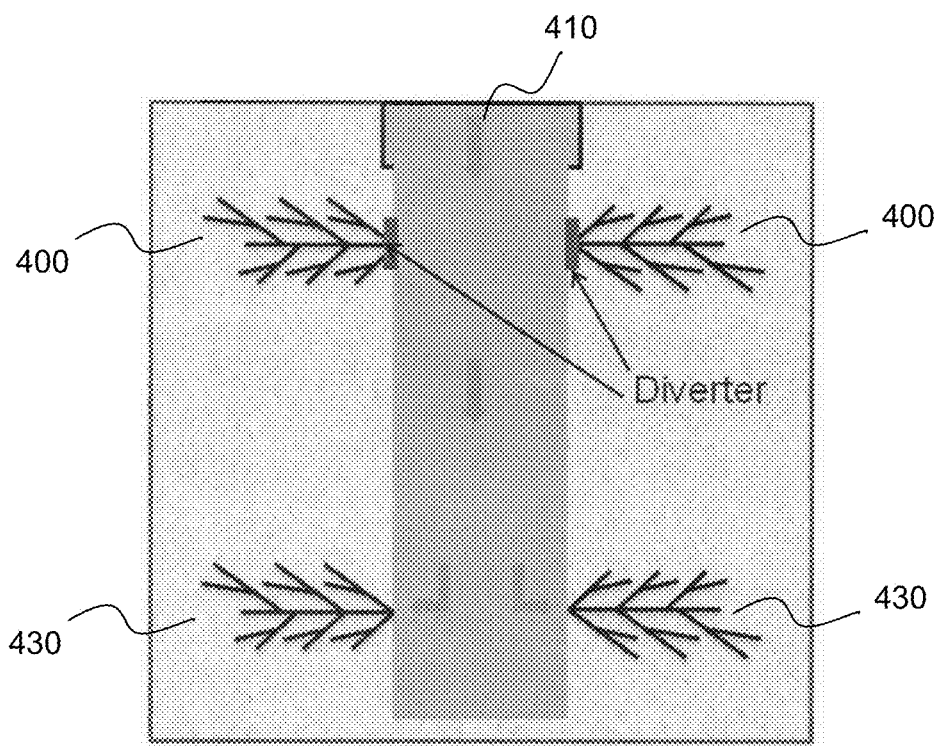
FIG. 4 is a schematic view of a well having a diverter oriented to hydraulically isolate the first fracture from the well and a second fracture network in accordance with one embodiment.

Specifically, referring now to FIG. 4 a first fracture 400 can be at least partially hydraulically isolated by introducing a particulate diverting agent into a well 410. The well 410 can be an injection well, production well or other well. A suspension of a carrier fluid and particulate diverting agent is mixed and pumped into the well 410. The amount of diverter material can vary, but in one example, can be about 200 lbs per treatment. Diverter materials can be stored on location in sacks, drums or super sacks (one cubic meter polyethylene bags). Material can be protected from the weather with plastic wrap, covering, and/or storage in a protected area. A total of 1000-2000 pounds of each selected diverter can generally be on hand at the well location. Actual amounts for each treatment will depend on the size, number and length of the fractures. The first stimulated fracture 400 initially accepts the carrier fluid and particulate diverting agent into passages within the first fracture 400. The particulate diverting agent becomes lodged within these passages near the wellbore face and seals off additional flow to form a temporary seal 420 which at least partially isolates the first fracture 400 from the well 410. The diverter 420 thus acts to seal off the first fracture 400 from accepting additional fluid. Furthermore, the diverting agent can be a fine particulate material, small enough to flow into the fractures in a dilute (solids to liquid water) ratio. As the material is pumped further into the fracture it begins to bridge and pack off. The liquid is squeezed out of the particle pack as pressure continues to be applied. The result is particulate material packed off in the fractures to form a temporary seal. This particle packed diverter is able to withstand differential pressure from the wellbore. The diverting agent material remains intact until it degrades and/or dissolves over time. The degradation is affected by temperature, as well. When the material degrades sufficiently it will eventually flow out of the wellbore or completely dissolve.

Additional pump pressure can be applied and a new set of fractures, typically below the first set of fractures, will open up and begin to take fluid. For example, additional pressure is applied to the well 410 using stimulation fluid sufficient to produce or expand a second fracture 430 to a desired length and volume. Most often, conditions are maintained so as to produce hydroshearing within the formation rather than hydrofracturing. As such, the second fracture is expanded under shear. In this manner, the stimulated fractures are self-propped when adjacent rock layers shift during hydroshearing. This condition can avoid trouble associated with conventional proppants. Specific stimulation conditions can vary depending on the formation, well depth and other variables. Pressure needed to induce fracture stimulation will be a function of multiple variables, including rock type, stress state of rock formations, and depth of formation. Regardless, stimulation pressure can be limited to hydroshearing pressures throughout the process. Stimulation time can vary but is generally from about 4 days to about 10 days for each fracture zone, and often about 7 days per fracture zone. Thus, stimulation of three fracture zones can be accomplished in about 21 days of pumping time. These times will vary depending on the size of the reservoir needed and the rate at which the stimulation fluid is pumped.

During stimulation native heat from surrounding formations can be removed, lowering the temperature within the wellbore and increasing the stability of the particulate diverting agent. This is due to the fact that the stimulation fluid is typically much lower in temperature than the formation being stimulated. In one aspect, the stimulation fluid can be circulated at a flow rate sufficient to cool the particulate diverting agent to a stable temperature where the particulate diverting agent is stable for at least 1 day, and in some cases at least 14 days. Although specific stability temperatures can vary depending on the particle, many materials are sufficiently stable at temperatures from about 90° C. to about 150° C. In some cases, particulate diverting agents can have a stability temperature up to about 200° C. In yet other cases, the particulate diverting agent can have a stability temperature from about 300° F. to about 600° F. Depending on conditions and the specific diverting agents, stability of the diverting agent can be maintained from about 3 days to about 3 weeks, and in some cases from about 5 days to about 2 weeks. Circulation rates of stimulation fluid can determine temperature around the particulate diverting agents. Substantial native heat within the formation can be locally removed from the well by controlling circulation rates of stimulation fluid. For example, in some cases circulation rates may be about 500 gpm to about 1000 gpm, although other rates can be suitable.

Additional optional isolation and stimulation steps can be used to form yet additional producing fractures (e.g. third, forth, etc.). This can be accomplished by introducing additional particulate diverting agents into the second fracture to at least partially hydraulically isolate the second fracture. This can generally be performed prior to allowing the particulate diverting agent within the first fracture to substantially degrade. The underground reservoir formation can then be stimulated sufficiently to produce or expand a third fracture within the underground reservoir formation in a similar manner as the second fracture. Additional fractures can also contribute to greater productivity in the wells and ultimately lower the cost to generate electricity in an EGS system. Further, additional fractures will typically be located deeper within the well such that slightly higher pressures will be used to create hydroshearing in subsequent locations.

Figure 5:
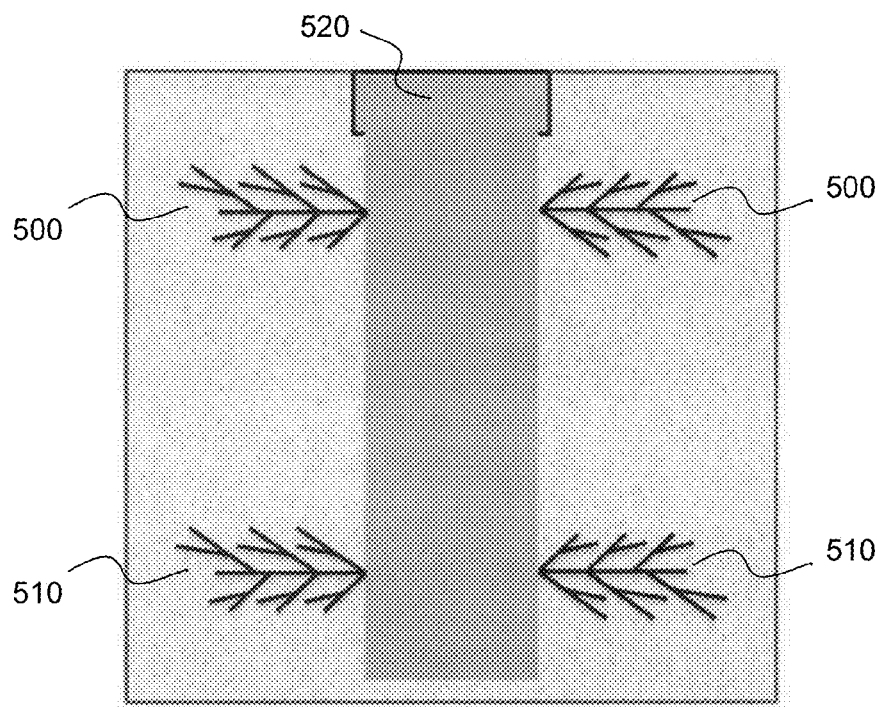
FIG. 5 is a schematic view of an exemplary well having the diverter removed in accordance with one embodiment.

As illustrated in FIG. 5, once stimulation of additional fractures is complete, the particulate diverting agent can be allowed to substantially degrade. The first fracture 500, second fracture 510, and other optional fractures are open and capable of receiving production fluid from the injection well 520. The particulate diverting agent can be allowed to degrade over time by exposure to native heat within the underground reservoir formation. As explained above, typical stimulation occurs using a cooled stimulation fluid. Reducing flow of the stimulation fluid to allow native heat within the underground reservoir formation will heat the particulate diverting agent and accelerate degradation. Accelerated degradation temperatures can vary depending on the specific materials. However, native temperatures in surrounding geothermal formations can generally be from about 180° C. to about 400° C., and often from about 230° C. to about 300° C. Thus, a decrease or termination in the flow of stimulation fluids can allow for relatively, rapid increases in temperatures adjacent to and at walls of the wells. The diverting agents, outlined in more detail below, are ultimately degraded substantially completely leaving all of the stimulated fractures open for circulation and flow during operation and recovery of heat by the EGS system. Advantages of using such a chemical diverter system over other mechanical systems for creating multiple stimulated fracture networks includes elimination of the need and associated cost and operational risk of a drilling rig on location during the stimulation. Further, targeted hydroshearing using these fracture isolation techniques can be performed on an open well with no casing such as a well with only a perforated or slotted well liner. The temporary particulate diverting material is capable of dissolving and does not permanently damage formation zones over time, especially with elevated temperature. The material will also not cause any long term permanent damage to the flow from potentially productive high temperature geothermal and/or oil and gas zones.

Although geothermal systems can benefit from application of these methods, other well systems such as oil and gas can also utilize these temporary diverting agents and associated methods to increase production. For example, stimulation of shale formations that are currently done with water and some amount of sand proppant can be significantly simplified and the cost greatly reduced when temporary diverters are used.

The particulate diverting agent can be a particulate material having a composition which substantially completely degrades within a predetermined time under predetermined conditions. For example, the diverting agent remains stable during stimulation sufficient to maintain isolation of an adjacent fracture. Some degradation during stimulation can be acceptable as long as sufficient hydraulic isolation is maintained within the well to expand a subsequent additional fracture.

Suitable diverting agents can include, but are not limited to, polymers, glasses, acid-base cements, composites thereof and mixtures thereof Non-limiting examples of suitable polymers can include polyester, thermosets, polycarbonate, polyaramid, and the like. Suitable polyesters can include polyethylene teraphthalate (PET), polybutylene succinate (PBS), polycaprolactone (PCL), polypropylene fumarate (PPF), polyhydroxyalkanoates (PHA), and combinations thereof. Suitable thermoset polymers can include thermoset phenol formaldehyde resin such as raw and thermoset polyoxybenzylmethylene glycolanhydride (Bakelite), and thermalset Bakelite, polyether ether ketone (PEEK), and combinations thereof. Other polymer materials which can be suitable include a polycarbonate (e.g. polybisphenyl carbonate, polypropylene carbonate), rayon, polyvinyl alcohol, polyglycolic acid, mixtures thereof, copolymers thereof, and combinations thereof In yet another aspect, the particulate diverting agent is a polyaramid e.g. meta-aramid such as poly (isophthaloyl chloride/m-phenylenediamine) (NOMEX), and para-aramid such as poly-paraphenylene teraphthalamide (KEVLAR), and the like. Table II lists several exemplary polymer materials and their degradation products.

Glasses can also provide high temperature stability with controllable degradation profiles. Non-limiting examples of suitable glasses can include borosilicate glass, soda lime glass, flint glass, fiberglass, and combinations thereof.

Another class of suitable materials for the particulate diverting agent can include an acid-base cement. Non-limiting examples of suitable acid-base cements can include magnesium oxy-acid cement, magnesium ammonium phosphate cement, magnesium potassium phosphate cement, magnesium oxyphosphate cement, calcium aluminate cement, and combinations thereof.

Acid base cements are materials that result from the reaction of a base in powder form with a liquid acid to produce a cementitious matrix and water. These cements are allowed to hydrate or set up to a hard material and then are ground into needed particle size distribution for effective use. Typical bases used for cement formation are oxides or carbonates of divalent and trivalent metals (e.g. calcium, cobalt, copper, and zinc), aluminosilicate glasses, and gelatinizing minerals. The latter minerals are those that contain small silicate groups such as orthosilicates, pyrosilicates, and silicates containing isolated six-membered silicate rings. Also included are minerals with large continuous silicon-oxygen networks that disintegrate into smaller silicate units including disilicates containing appreciable ferric iron in the silicon-oxygen sheets or three-dimensional network silica minerals that contain aluminum in the ratio of at least two aluminum atoms to three silicon atoms. The acid portion of the cement is typically an

TABLE II

| Material | Expected Effective Temp. Range | Chemical Composition | Degradation Byproducts |
| --- | --- | --- | --- |
| Polycarbonate | <300 ° F. | Variable | Carbon dioxide and a diol. If the diol is a phenol the products will be toxic. Polyethylene carbonate may be useful, producing ethylene glycol |
| PHA (poly 3-hydroxyalkanoates) | | $-[O-CH_2-CH_2-\overset{R}{\underset{|}{C}}-\overset{O}{\underset{\|}{C}}-O]-CH_2-CH_2-\overset{R}{\underset{|}{C}}-\overset{O}{\underset{\|}{C}}-OH$ | Hydrolysis produces the corresponding hydroxyacids that are mostly non-toxic |
| Rayon | 400-600 | (cellulose structure) | oligosaccharides and hexoses (mainly glucose) |
| Polyvinyl Alcohol | 400-750 | $(CH_2CH_2OH)_n$ | org. acids such as acetic acid and aromatic compounds such as benzaldehyde, benzophenone and acetophenone |
| PGA (Poly Glycolic Acid) | 300-400 | $(C_2H_2O_2)_n$ | Glycolic acid and other. | aqueous solution of inorganic or organic acids including phosphoric acid, multifunctional carboxylic acids, phenolic compounds, polymers bearing carboxylate or phosphate sidegroups, and aqueous metal salts (typically chlorides, phosphates, and sulfates).

A wide range of acid-base cement diverter particles can be produced due to the large variety of acid and base sources that may be utilized. Thus it is possible to adjust the properties of the diverter particles for different rates and temperatures at which dissolution takes place.

As an example, magnesium oxide may be used as a base source, and aqueous magnesium chloride may be used as an acid source to produce an acid-base cement having the chemical formula of $5[Mg(OH)_2](MgCl_2).8H_2O$ (different cements can be produced by varying the ratio of MgO and $MgCl_2$). As still another example, magnesium oxide may be used as the base component and aqueous magnesium sulfate may be chosen as an acid source, to produce magnesium oxysulfate acid-base cements such as the 3-form with the composition $3[Mg(OH)_2]MgSO_4).8H_2O$. Similarly magnesium oxide may be reacted with aqueous dihydrogen phosphate salts to produce an acid-base cement having the chemical formula $MMg(PO_4).6H_2O$(where M=alkali metal cation or ammonium). A different magnesium oxyphosphate cement, $MgHPO_4.3H_2O$ can be produced from magnesium oxide and aqueous phosphoric acid as the acid source.

Although not required, degradation of cement diverting agents can be accelerated by use of an acid that converts the cement to water-soluble salts, aqueous carbon dioxide, or by use of a chelating agent that causes the dissolution of the cement. Furthermore, cement based diverting agents are capable of maintaining stability at very high temperatures. Diverter materials which degrade very rapidly at high temperatures may not be suitable for temporary diversion and sealing of stimulated fractures for EGS and other geothermal applications. The acid-base cements are effective for many weeks and in some cases months and can be adapted for use at a variety of temperatures.

Other inorganic materials which are suitable for the particulate diverting agent can include calcium carbonate, amorphous silicon dioxide, crystalline silicon dioxide, alumina, aluminum hydroxide, aluminum oxyhydroxide (Boehmite), and combinations thereof. In one aspect, the diverting agents can be formed of one or more of alumina ($Al_2O_3$), aluminum hydroxide ($AlOH_3$), and aluminum oxyhydroxide (Boehmite, AlOOH).

Degradation kinetics can alternatively be tailored to match stimulation times and conditions. For example, choice of specific materials and particle sizes can affect degradation kinetics. However, mixtures of different materials can also be used to provide composite degradation profiles where different portions of the diverter degrade at differing rates. This can allow a staged opening of newly stimulated fractures or can provide controlled distribution of stimulation fluids, which changes during degradation.

Materials for diverting agents can be selected to be benign and to have benign breakdown products. Polymeric particles tend to degrade via hydrolysis, typically into non-persistent compounds, which circulate out of fractures. Inorganic particles, on the other hand, most often degrade via dissolution with time and as their temperature increases. Particulate size distributions can be chosen depending on the type of formation, expected fracture width, and desired distribution within a fracture to achieve a desirable degree of hydraulic isolation. Although desired particle sizes can range depending on the formation and desired degree of isolation, typical sizes can range from about 0.005 mm to about 2 cm. Particle shapes can also be varied to achieve desirable packing and degradation characteristics. For example, particles can be spherical, irregular, fibers, rods, blocks or other shapes, including combinations of these shapes. Corresponding materials can be ground from larger material or grown and formed having a desired morphology. For example, the particles can be formed as a distribution of particles and/or in other shapes to enhance the sealing ability of the system.

Figure 6:
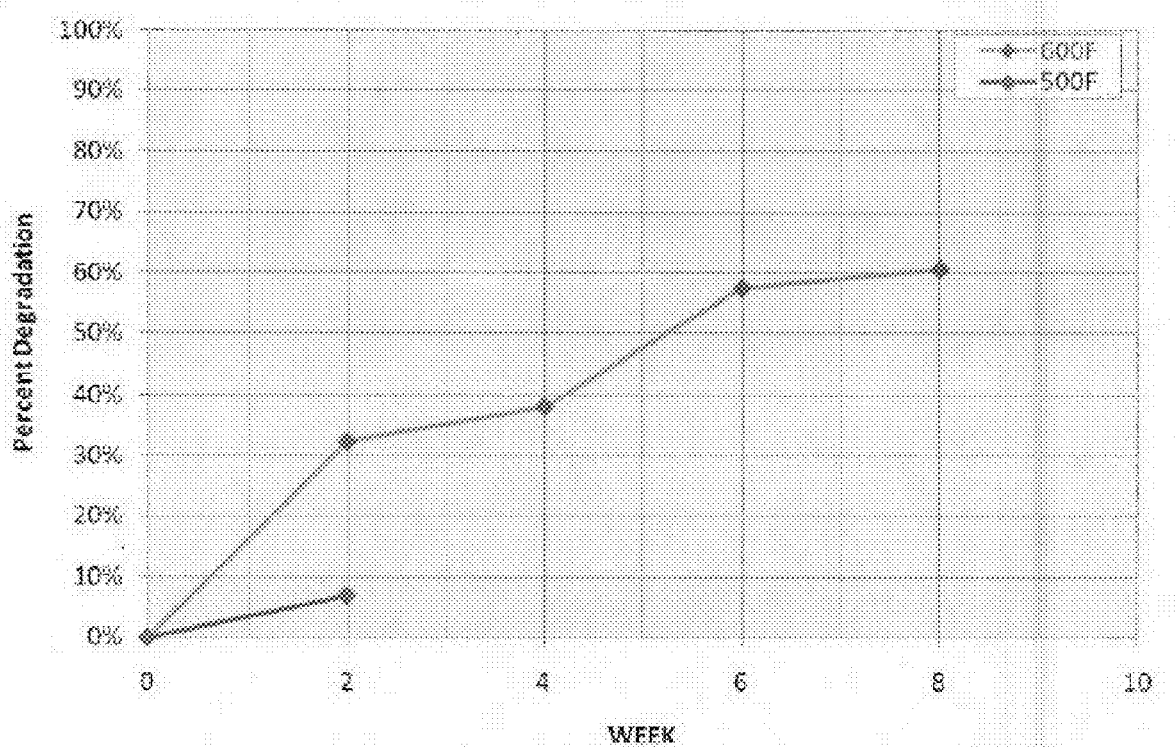
FIG. 6 shows a graph of percent degradation for calcium carbonate at 500° F. and 600° F., according to one embodiment.
Figure 7A:
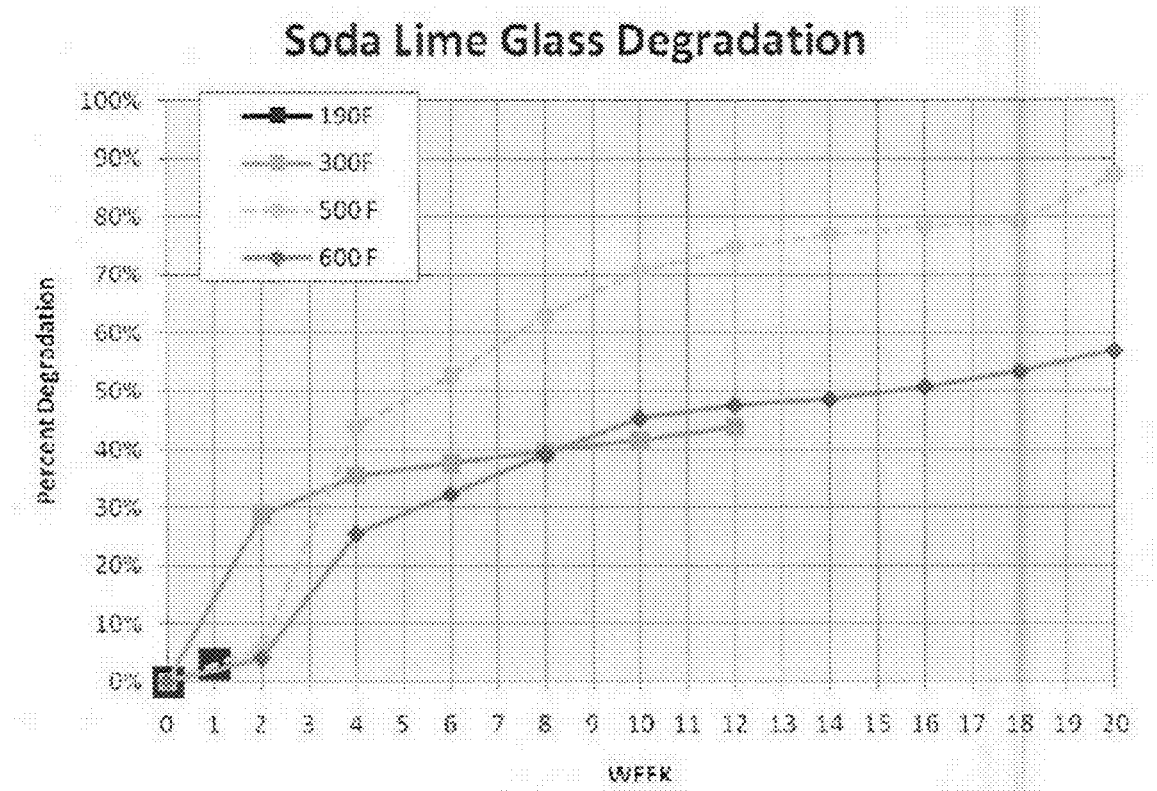
FIG. 7A is a graph of soda lime glass percent degradation at 190° F., 300° F., 500° F. and 600° F. over 20 weeks, according to one embodiment.
Figure 7B:
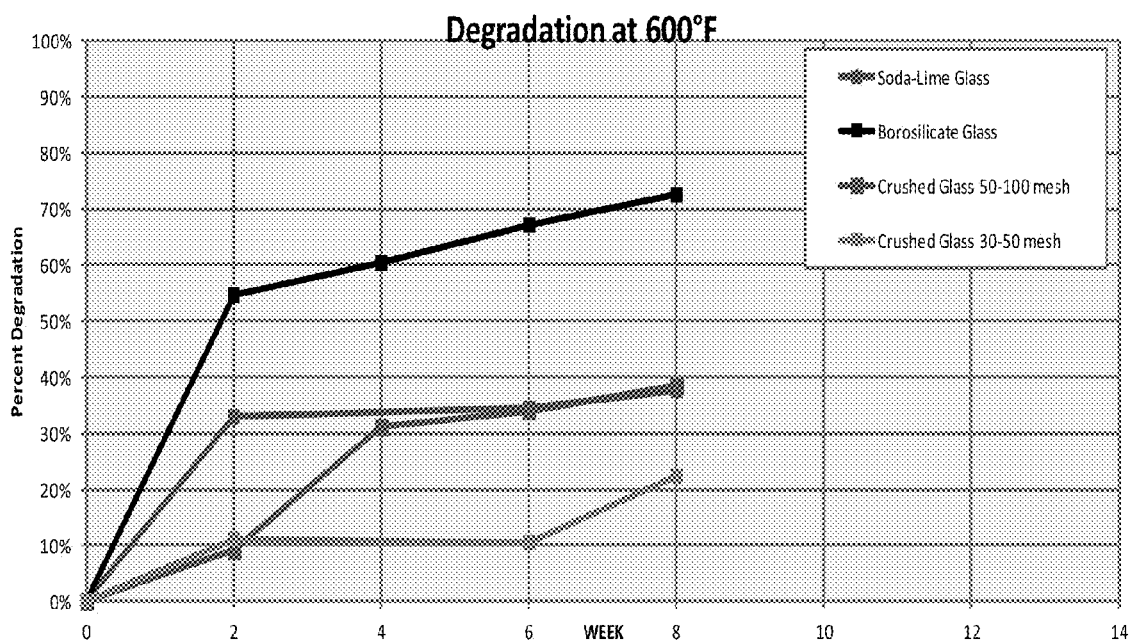
FIG. 7B is a graph of percent degradation for several glasses at 600° F. over eight weeks, according to one embodiment.
Figure 7C:
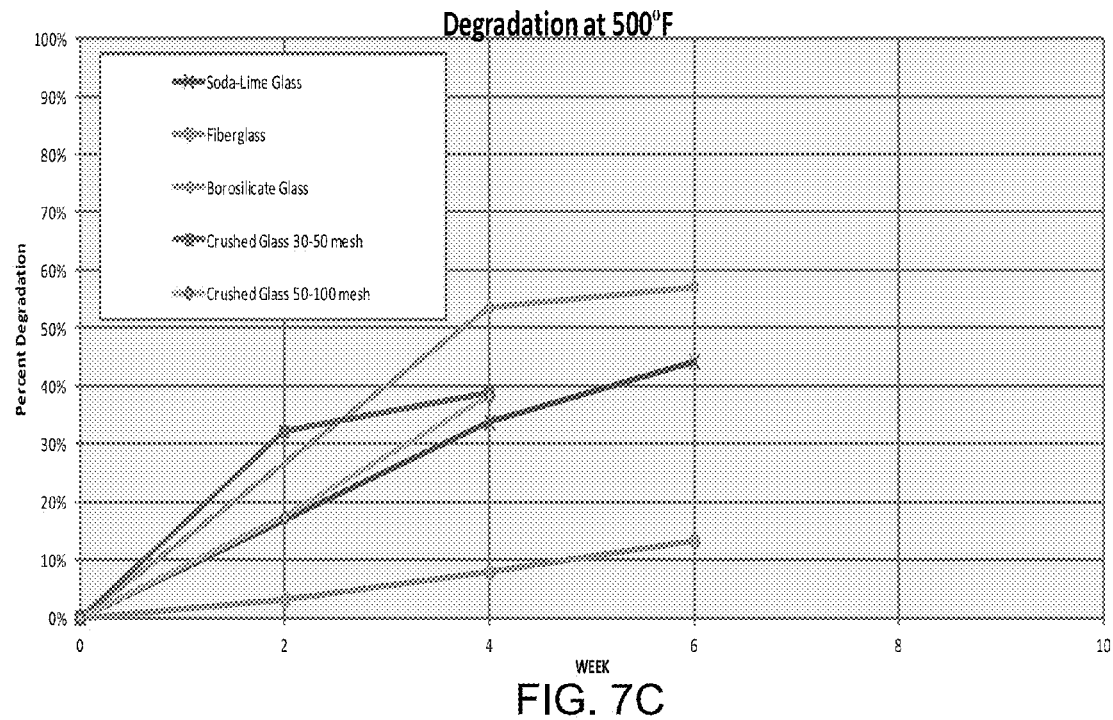
FIG. 7C is a graph of percent degradation for several glasses at 500° F. over eight weeks.
Figure 7D:
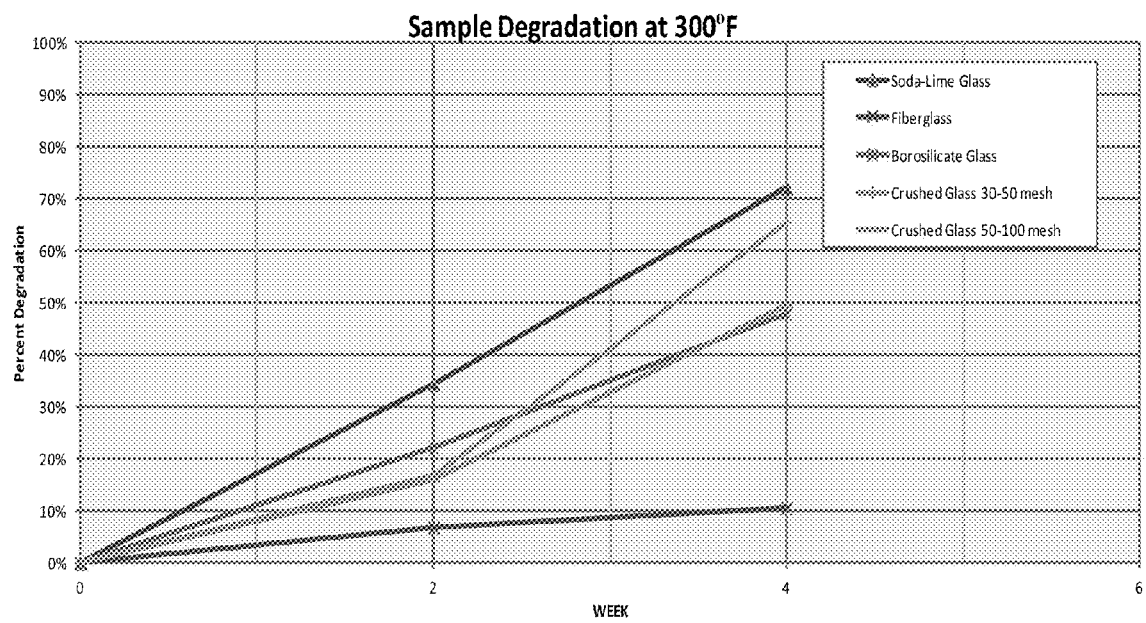
FIG. 7D is a graph of percent degradation for several glasses at 300° F. over eight weeks, according to one embodiment.

Choice of specific materials for the particulate diverting agents can be a function of degradation kinetics, production timing, native temperatures, and other variables. FIG. 6 shows a graph of percent degradation for calcium carbonate at 500° F. and 600° F. FIG. 7A is a graph of soda lime glass percent degradation at 190° F., 300° F., 500° F. and 600° F. for 20 weeks. FIG. 7B is a graph of percent degradation for several glasses at 600° F. for 8 weeks. FIG. 7C is a graph of percent degradation for several glasses at 500° F. for 8 weeks. FIG. 7D is a graph of percent degradation for several glasses at 300° F. for 8 weeks.

Figure 8:
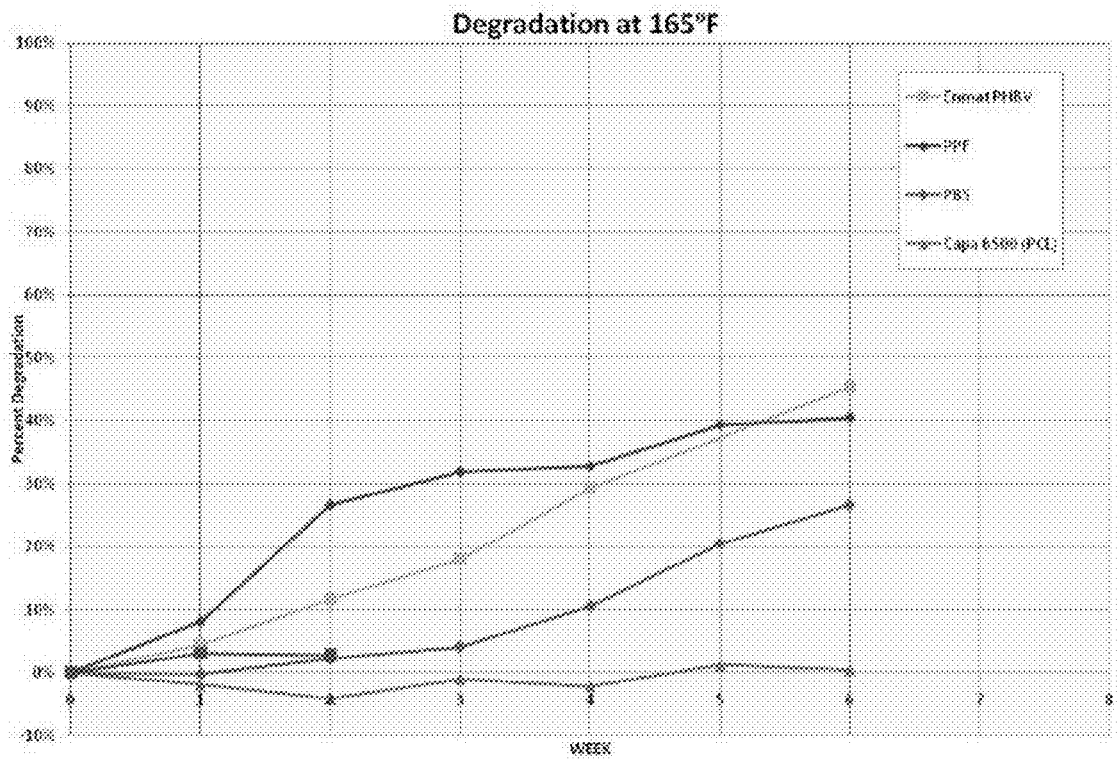
FIG. 8 is a graph of percent degradation for several polymer materials at 165° F. over several weeks, according to one embodiment.
Figure 9:
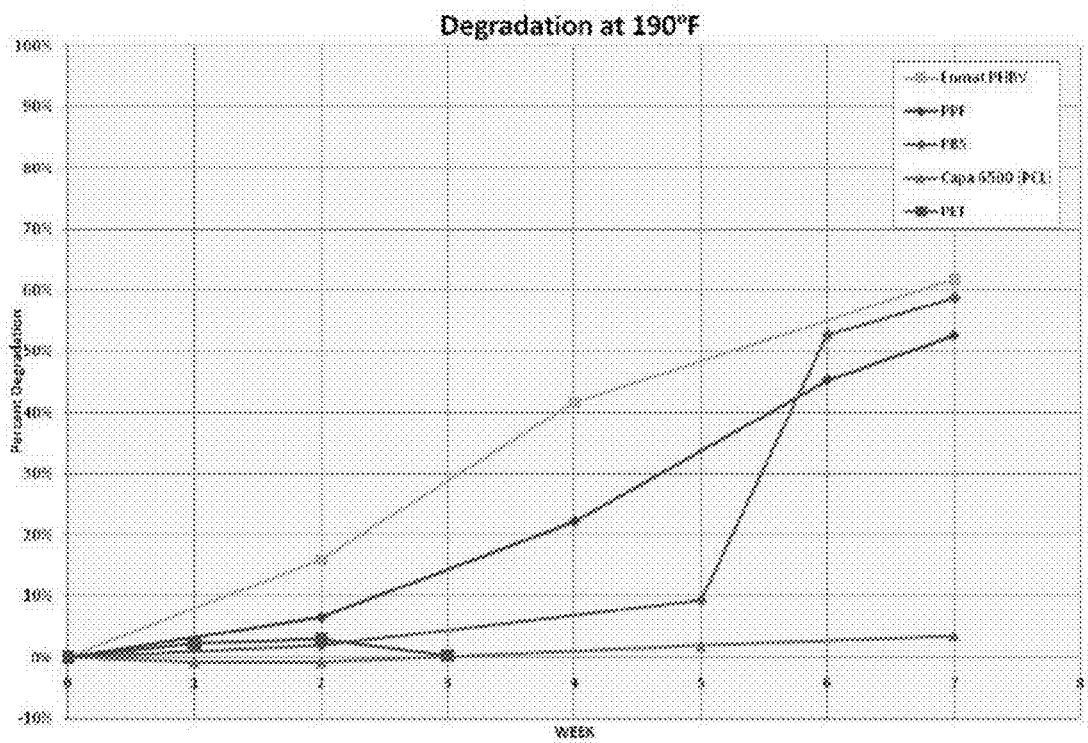
FIG. 9 is a graph of percent degradation for several polymer materials at 190° F. over several weeks, according to one embodiment.
Figure 10:
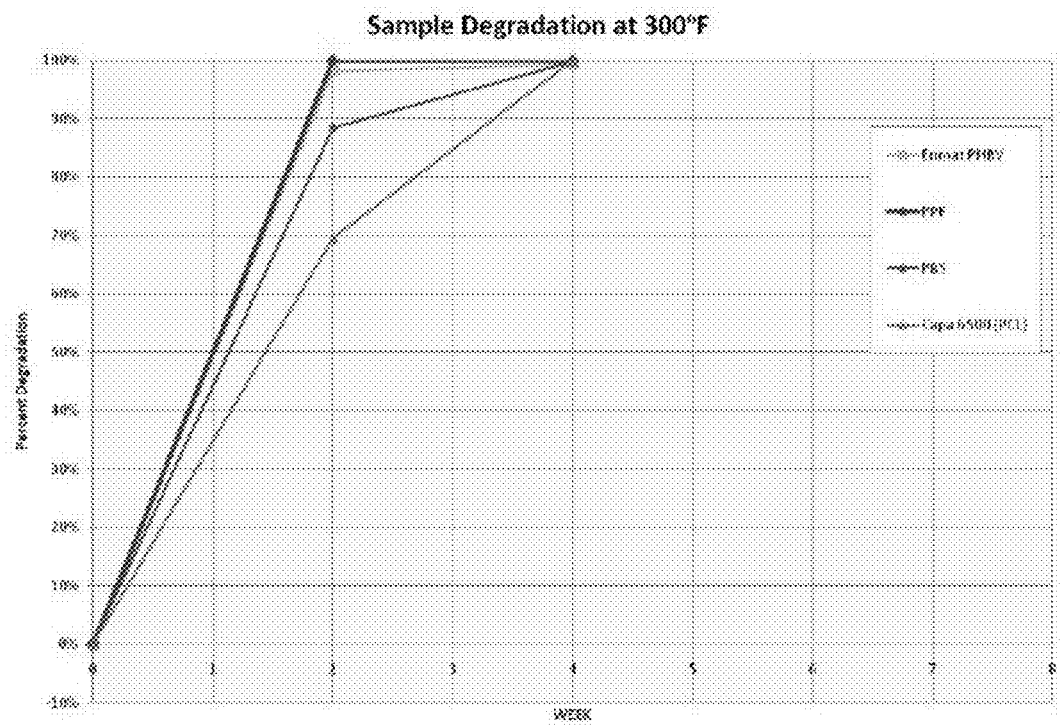
FIG. 10 is a graph of percent degradation for several polymer materials at 300° F. over several weeks, according to one embodiment.

FIG. 8 is a graph of percent degradation for several polymer materials at 165° F. over several weeks. FIG. 9 is a graph of percent degradation for several polymer materials at 190° F. over several weeks. Similarly, FIG. 10 is a graph of percent degradation for several polymer materials at 300° F. over several weeks. Notably, all four of the polymer materials in FIG. 10 (PHBV, PPF, PBS and PCL) may be substantially completely degraded in 4 weeks at 300° F.

Figure 11A:
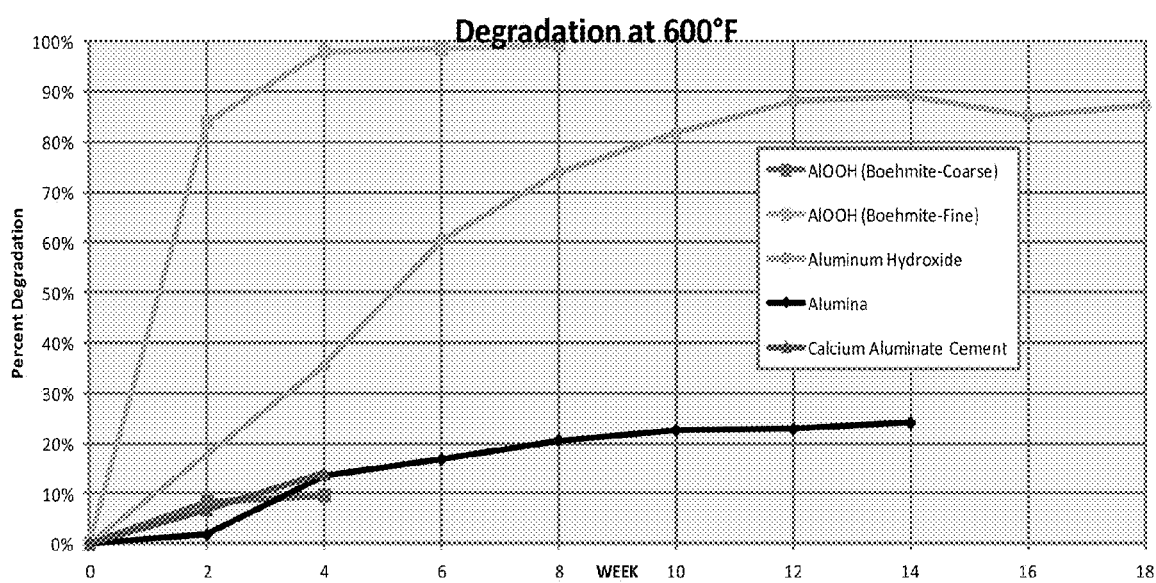
FIG. 11A is a graph of percent degradation for Boehmite, aluminum hydroxide, alumina, and calcium aluminate at 600° F. over four weeks, according to one embodiment.
Figure 11B:
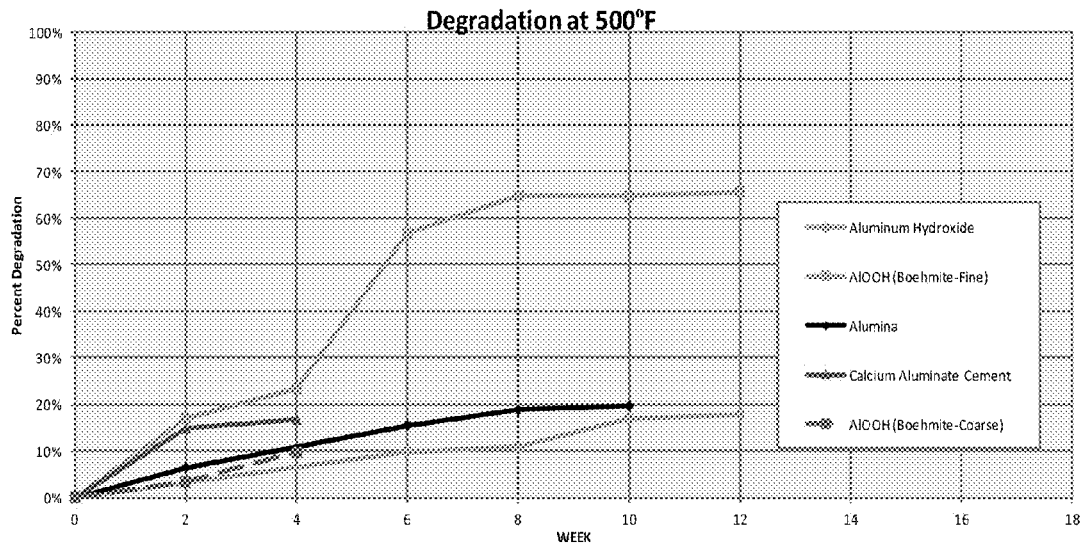
FIG. 11B is a graph of percent degradation for these materials at 500° F. over four weeks, according to one embodiment.
Figure 11C:
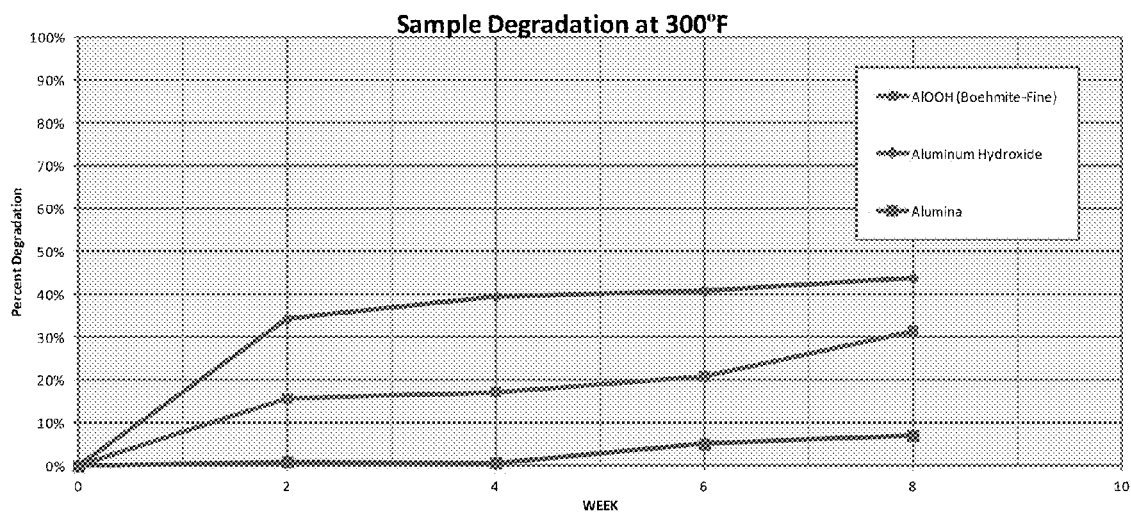
FIG. 11C is a graph of percent degradation for Boehmite and aluminum hydroxide at 300° F. over four weeks, according to one embodiment.
Figure 11D:
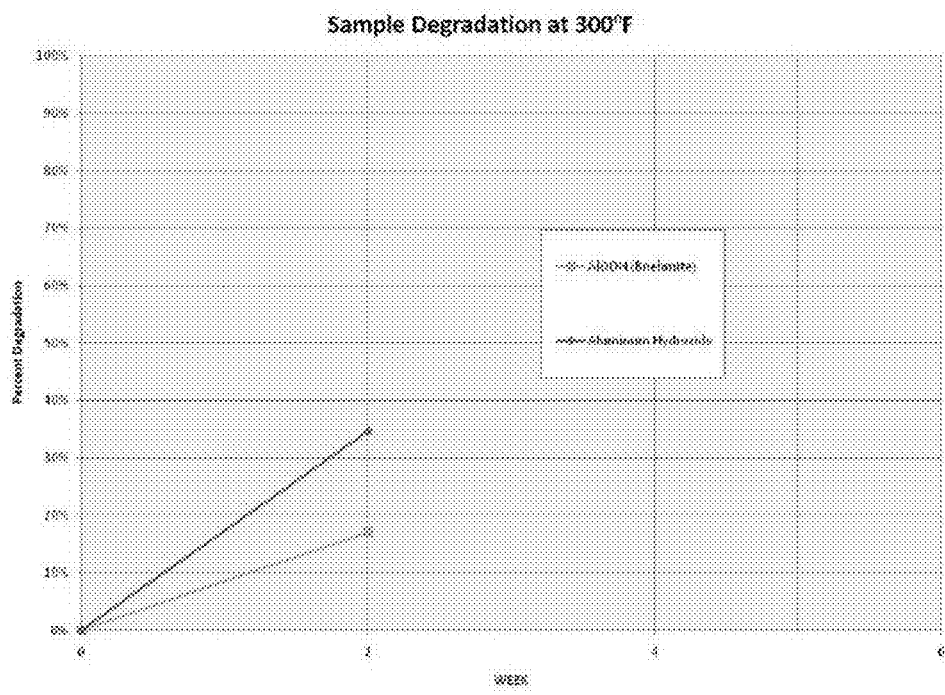
FIG. 11D is a graph of percent degradation for Boehmite and aluminum hydroxide at 300° F. over four weeks, according to one embodiment.
Figure 11E:
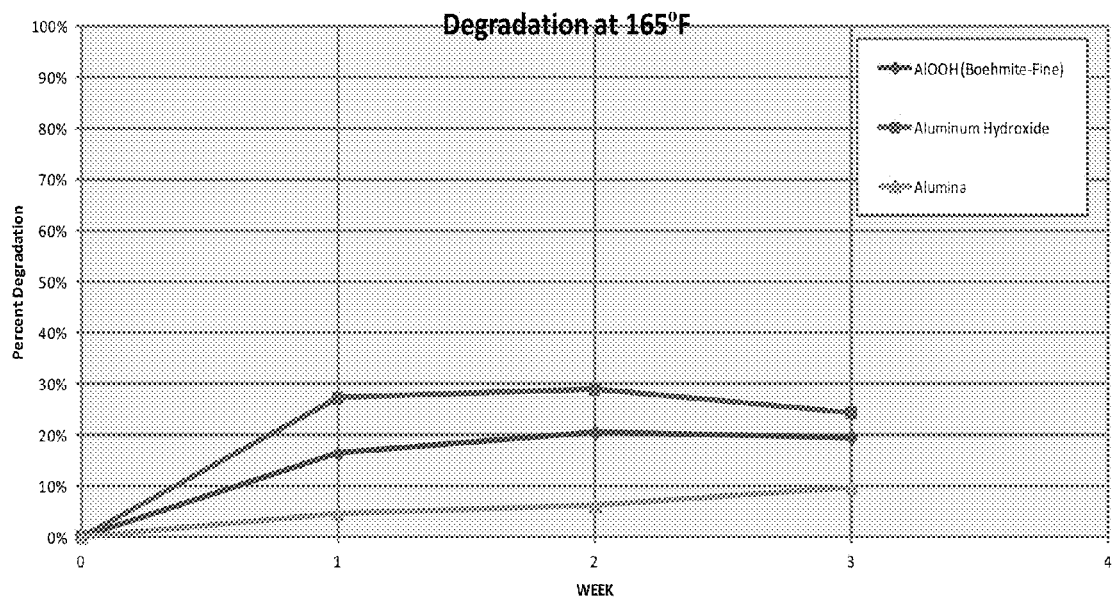
FIG. 11E is a graph of percent degradation for Boehmite, aluminum hydroxide, and alumina at 165° F., according to one embodiment.

FIG. 11A is a graph of percent degradation for Boehmite, aluminum hydroxide, alumina, and calcium aluminate at 600° F. over 4 weeks. Note that the Boehmite was substantially degraded over 4 weeks. FIG. 11B is a graph of percent degradation for these materials at 500° F. over 4 weeks. FIG. 11C is a graph of percent degradation for Boehmite and aluminum hydroxide at 300° F. over 4 weeks. FIG. 11D is a graph of percent degradation for Boehmite and aluminum hydroxide at 300° F. over 4 weeks. FIG. 11E is a graph of percent degradation for Boehmite, aluminum hydroxide, and alumina at 165° F.

Figure 12A:
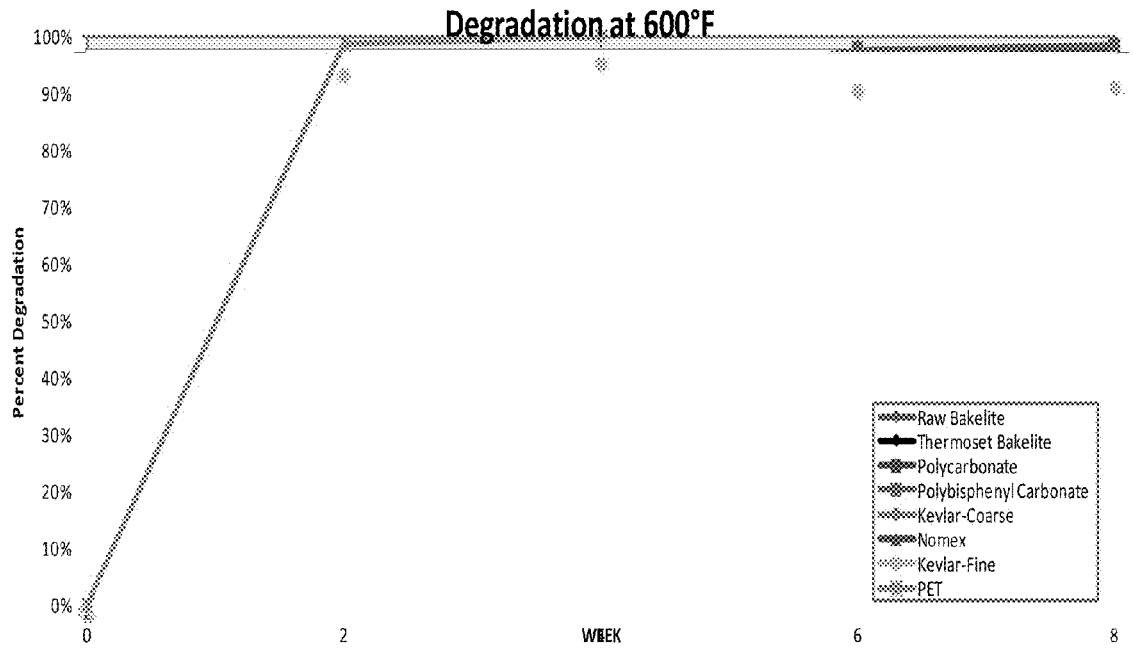
FIG. 12A is a graph of percent degradation for raw Bakelite, thermoset Bakelite, polycarbonate, polybisphenol carbonate, coarse KEVLAR, NOMEX, fine KEVLAR, and PET at 600° F. for 8 weeks, according to one embodiment.
Figure 12B:
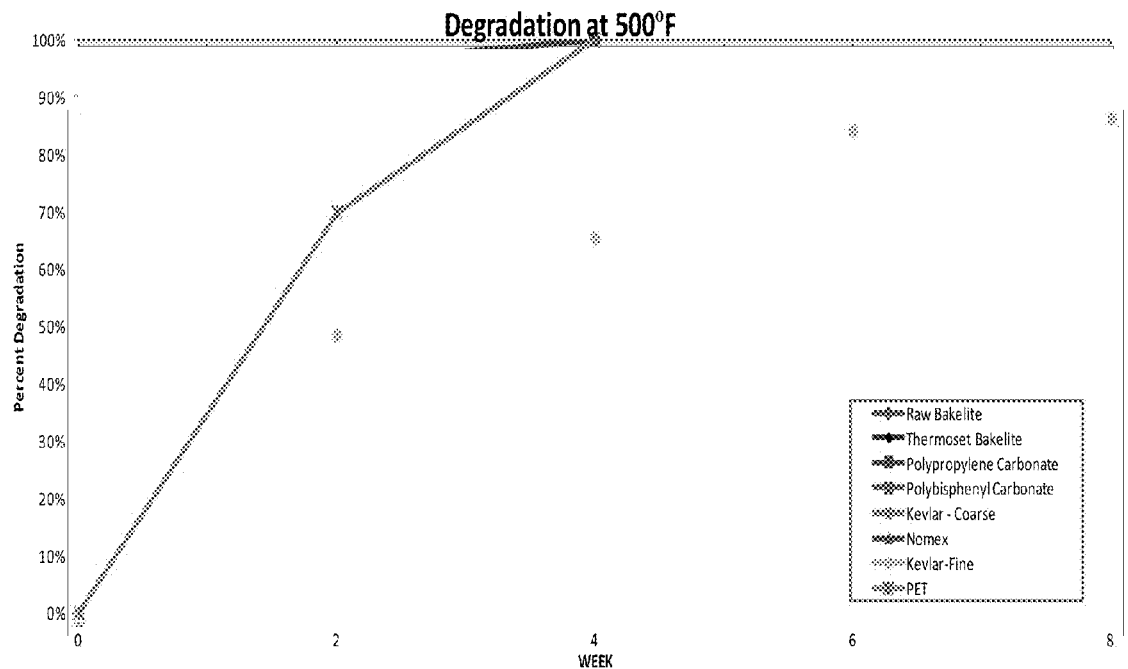
FIG. 12B is a graph of percent degradation for raw Bakelite, thermoset Bakelite, polycarbonate, polybisphenol carbonate, coarse KEVLAR, NOMEX, fine KEVLAR, and PET at 500° F. for 8 weeks, according to one embodiment.
Figure 12C:
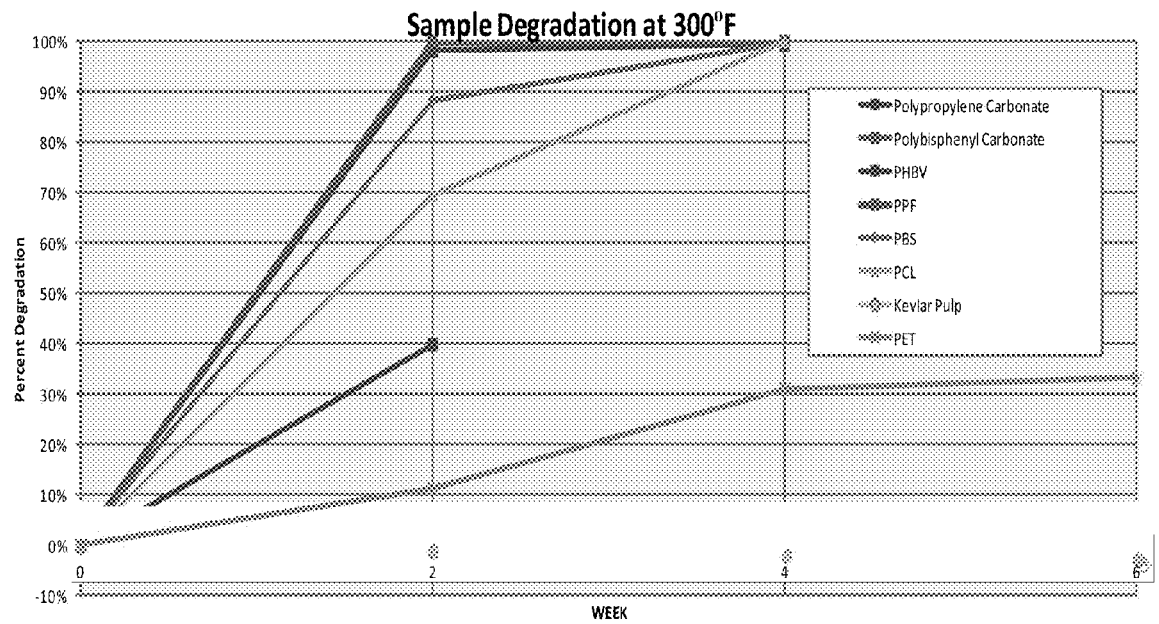
FIG. 12C is a graph of percent degradation for polypropylene carbonate, polybisphenol carbonate, PHBV, PPF, PBS, PCL, KEVLAR pulp, and PET at 300° F. for 6 weeks, according to one embodiment.
Figure 12D:
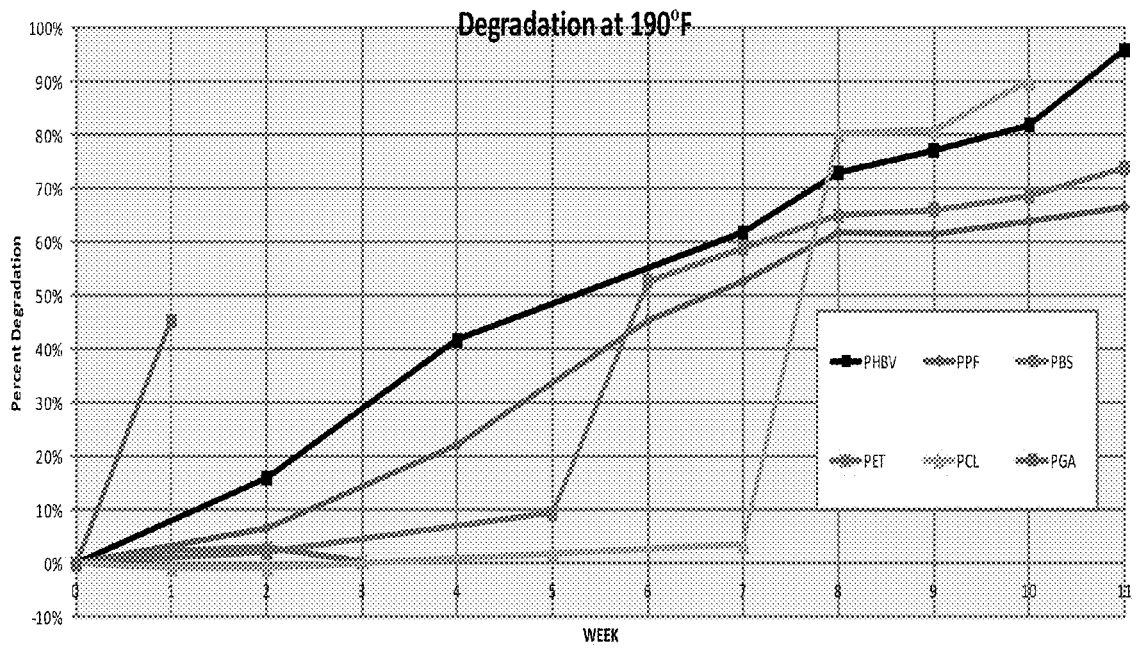
FIG. 12D is a graph of percent degradation for PHBV, PPF, PBS, PET, PCL and PGA at 190° F. for 11 weeks, according to one embodiment.
Figure 12E:
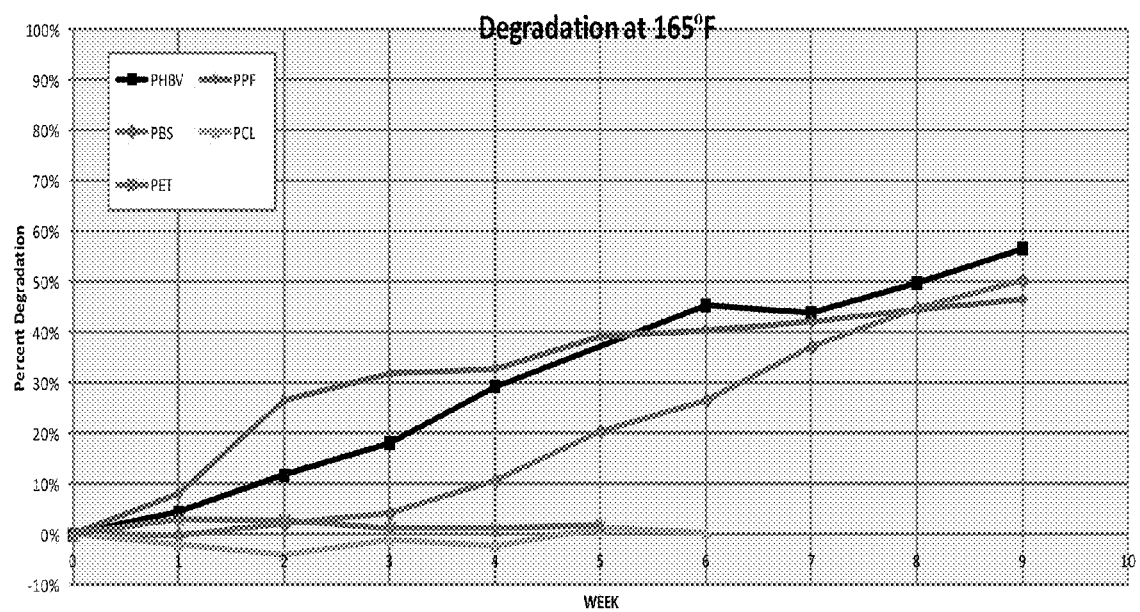
FIG. 12E is a graph of percent degradation for PHBV, PPF, PBS, PET, and PCL at 165° F. for 9 weeks, according to one embodiment.

FIG. 12A is a graph of percent degradation for raw Bakelite, thermoset Bakelite, polycarbonate, polybisphenol carbonate, coarse KEVLAR, NOMEX, fine KEVLAR, and PET at 600° F. over 8 weeks. FIG. 12B is a graph of percent degradation for raw Bakelite, thermoset Bakelite, polycarbonate, polybisphenol carbonate, coarse KEVLAR, NOMEX, fine KEVLAR, and PET at 500° F. over 8 weeks. FIG. 12C is a graph of percent degradation for polypropylene carbonate, polybisphenol carbonate, PHBV, PPF, PBS, PCL, KEVLAR pulp, and PET at 300° F. over 6 weeks. FIG. 12D is a graph of percent degradation for PHBV, PPF, PBS, PET, PCL and PGA at 190° F. over 11 weeks. FIG. 12E is a graph of percent degradation for PHBV, PPF, PBS, PET, and PCL at 165° F. over 9 weeks.

Calcium carbonate is one material which can be suitable with a low temperature stability and high temperature degradability. The predominant dissolved calcium species of calcium carbonate is $Ca^{2+}$. Notably, higher temperature will accelerate the rate dissolution of the calcium carbonate. Table III illustrates calcium carbonate solubility at various temperatures and outlines the corresponding half-life.

TABLE III

Solubility of $CaCO_3$ Under Varying Temperature and Pressure

| Temperature (F.) | Half-life (weeks) |
|---|---|
| 100 | 1225 |
| 200 | 240 |
| 300 | 71 |
| 400 | 28 |

TABLE III-continued

Solubility of CaCO₃ Under Varying Temperature and Pressure

| Temperature (F.) | Half-life (weeks) |
|---|---|
| 500 | 13 |
| 600 | 7 |
| 700 | 5 |

At temperatures above about 500° F., the calcium carbonate will degrade relatively substantially while at lower temperatures (e.g. less than about 400° F.) the calcium carbonate remains relatively stable for typical stimulation times of several weeks.

Silicon dioxide dissolves congruently in pure water to produce silicic acid. In pure water the solubility rate of silicon dixoide is dependent on the nature of the silicon oxide phase: amorphous silicon dioxide dissolves faster than cristobalite which is, in turn, dissolves faster than quartz. Table IV outlines dissolution for silicon dioxide at various temperatures.

TABLE IV

Half-Lives for Dissolution of Amorphous Silica and Quartz

| Temperature (F.) | Amorphous Silicon Dioxide Half Life (weeks) | Quartz Half Life (weeks) |
|---|---|---|
| 100 | 97767 | 5071696 |
| 200 | 2357 | 82198 |
| 300 | 148 | 3728 |
| 400 | 18.2 | 349 |
| 500 | 3.64 | 55.3 |
| 600 | 0.98 | 12.1 |
| 700 | 0.34 | 3.51 |

Notably, silicon dixoide has a very high stability up to temperatures above about 500° F. (amorphous silicon dixoide) and 600° F. (quartz). Additional degradation aids can optionally be used to accelerate degradation of these materials. For example, sodium hydroxide, potassium hydroxide, or the like can dissolve silicon dioxide. Optionally, a mixture of ethylene glycol, triethanolamine, and sodium hydroxide can be used to form silatrane glycol which is sufficiently stable to allow simple removal from the fractures.

A magnesium ammonium phosphate cement may be synthesized using 30.4 parts ammonium dihydrogen phosphate, 40.2 parts of magnesium oxide, and 29.4 parts water. The solids may be added to the water and stirred in to give a paste that set to a hard solid in 3 minutes. This cement consists of struvite, $NH_4MgPO_4.6H_2O$, usually accompanied by schertelite, $(NH_4)_2Mg(HPO_4)_2.4H_2O$ and traces of dittmarite, $NH_4MgPO_4.H_2O$, and/or stercorite, $NaNH_4HPO_4.4H_2O$. The cement may be aged for 24 hours and then lightly ground. A portion of the resulting powder is heated in a bath of deionized water at 170° F. After 3.5 days the cement may lose 8.2% by weight.

A magnesium potassium phosphate cement may be prepared in the same manner as the magnesium ammonium phosphate cement by replacing the ammonium dihydrogen phosphate with an equimolar mount of potassium dihydrogen phosphate and additional water (23.6 parts potassium dihydrogen phosphate, 26.7 parts of magnesium oxide, and 49.7 parts water). The solids may be added to the water and stirred in to give a paste that sets to a hard solid in 10 minutes. This cementing phase present is mainly $KMg(PO_4).6H_2O$. A portion of the resulting powder was heated in a bath of deionized water at 170° F. After 3.5 days the cement may lose 31.5% by weight.

A different magnesium oxyphosphate cement, $MgHPO_4.3H_2O$ can be produced from magnesium oxide and aqueous phosphoric acid as the acid source. This mineral may be obtained from a commercial source. A portion of the resulting powder may be heated in a bath of deionized water at 170° F. After 3.5 days the cement may gain 23.8% by weight. A hydrated phase may be formed, such as $MgHPO_4.3H_2O$.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

What is claimed is:

1. A method of hydraulic stimulation in underground reservoir formations, comprising:
    introducing a particulate diverting agent into a first fracture within an underground reservoir formation sufficient to at least partially hydraulically isolate the first fracture, the particulate diverting agent being a temporary material which substantially degrades over an extended time upon exposure to heat at a degradation temperature;
    stimulating the underground reservoir formation with a stimulation fluid at a temperature below the degradation temperature sufficient to expand a second fracture within the underground reservoir formation; and
    allowing the particulate diverting agent to substantially degrade by reducing flow of the stimulation fluid to allow native heat within the underground reservoir formation to heat the particulate diverting agent to the degradation temperature.

2. The method of claim 1, wherein the particulate diverting agent is selected from the group consisting of polymer, glass, acid-base cement and combinations thereof.

3. The method of claim 2, wherein the particulate diverting agent is a polyester selected from the group consisting of polyethylene teraphthalate (PET), polybutylene succinate (PBS), polycaprolactone (PCL), polypropylene fumarate (PPF), polyhydroxyalkanoates (PHA), and combinations thereof.

4. The method of claim 2, wherein the particulate diverting agent is a thermoset polymer selected from the group consisting of thermoset phenol formaldehyde resin, polyether ether ketone (PEEK), and combinations thereof.

5. The method of claim 2, wherein the particulate diverting agent is a polycarbonate, rayon, polyvinyl alcohol, polyglycolic acid, and combinations thereof.

6. The method of claim 5, wherein the particulate diverting agent is a polycarbonate including at least one of polybisphenyl carbonate and polypropylene carbonate.

7. The method of claim 2, wherein the particulate diverting agent is a polyaramid.

8. The method of claim 2, wherein the particulate diverting agent is at least one of poly(isophthaloyl chloride/m-phenylenediamine) (NOMEX) and poly-paraphenylene teraphthalamide (KEVLAR).

9. The method of claim 2, wherein the particulate diverting agent is calcium carbonate.

10. The method of claim 2, wherein the particulate diverting agent is amorphous or crystalline silicon dioxide.

11. The method of claim 2, wherein the particulate diverting agent is a glass selected from the group consisting of borosilicate glass, soda lime glass, flint glass, fiberglass, and combinations thereof.

12. The method of claim 2, wherein the particulate diverting agent is a acid-base cement selected from the group consisting of magnesium oxy-acid cement, magnesium ammonium phosphate cement, magnesium potassium phosphate cement, magnesium oxyphosphate cement, calcium aluminate cement, and combinations thereof.

13. The method of claim 1, wherein the particulate diverting agent is selected from the group consisting of calcium carbonate, amorphous silicon dioxide, crystalline silicon dioxide, alumina, aluminum hydroxide, aluminum oxyhydroxide (Boehmite), and combinations thereof.

14. The method of claim 1, wherein the introducing and stimulating occur within a common subterranean well.

15. The method of claim 14, wherein the common subterranean well does not include a well casing.

16. The method of claim 1, wherein the underground reservoir formation is a geothermal reservoir.

17. The method of claim 1, wherein the stimulating occurs sufficient to expand the second fracture under shear.

18. The method of claim 1, wherein the stimulation fluid is circulated at a flow rate sufficient to cool the particulate diverting agent to a stability temperature where the particulate diverting agent is stable for at least 1 days.

19. The method of claim 1, further comprising:
   introducing additional particulate diverting agent into the second fracture to at least partially hydraulically isolate the second fracture prior to the step of allowing the particulate diverting agent within the first fracture to substantially degrade; and
   stimulating the underground reservoir formation sufficient to produce or expand a third fracture within the underground reservoir formation.

* * * * *